United States Patent [19]

Musch et al.

[11] 4,405,742
[45] Sep. 20, 1983

[54] PROCESS FOR THE PRODUCTION OF HIGH MOLECULAR WEIGHT POLYCHLOROPRENE AND ITS USE AS A STARTING MATERIAL FOR ADHESIVES

[75] Inventors: Rüdiger Musch; Rüdiger Schubart, both of Berg-Gladbach; Wilhelm Göbel, Leverkusen; Heinrich Alberts, Cologne; Gerhard Hohmann, Leverkusen, all of Fed. Rep. of Germany

[73] Assignee: Bayer Aktiengesellschaft, Leverkusen, Fed. Rep. of Germany

[21] Appl. No.: 280,018

[22] Filed: Jun. 30, 1981

[30] Foreign Application Priority Data

Jul. 2, 1980 [DE] Fed. Rep. of Germany ....... 3025076
Jul. 2, 1980 [DE] Fed. Rep. of Germany ....... 3025077
Jul. 12, 1980 [DE] Fed. Rep. of Germany ....... 3026502

[51] Int. Cl.³ .............................. C09J 3/12; C08F 2/38; C08F 2/24
[52] U.S. Cl. .................................... 524/315; 524/476; 524/552; 525/331.3; 525/348; 525/374; 525/375; 525/385; 526/82; 526/83; 526/84; 526/85; 526/204; 526/209; 526/217; 526/222
[58] Field of Search ............... 525/348, 343, 374, 375; 526/204, 208, 209, 217, 218, 220, 222, 82, 83, 84, 85; 524/315, 476, 552

[56] References Cited

U.S. PATENT DOCUMENTS

| | | | |
|---|---|---|---|
| 2,066,330 | 1/1937 | Carothers | 526/295 |
| 3,775,388 | 11/1973 | Khan | 526/83 |
| 3,985,942 | 10/1976 | Suzuki | 526/204 |
| 4,124,754 | 11/1978 | Miller | 526/295 |
| 4,303,765 | 12/1981 | Musch | 525/343 |

Primary Examiner—C. A. Henderson

Attorney, Agent, or Firm—Connolly and Hutz

[57] ABSTRACT

By adding substances corresponding to the following general formula I

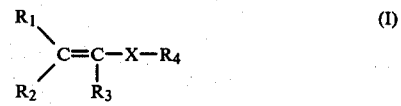

in which X=O, S or N—$R_5$; $R_1$=hydrogen, $C_1$–$C_{19}$-alkyl, $C_2$–$C_{19}$-alkenyl, phenyl, $C_1$–$C_4$-alkylene phenyl, $C_5$–$C_{12}$-cycloalkyl or $C_5$–$C_{12}$-cycloalkenyl; $R_2$=hydrogen, $C_1$–$C_{19}$-alkyl, $C_2$–$C_{12}$-alkenyl, phenyl or $C_1$–$C_4$-alkylene phenyl; $R_3$=hydrogen, $C_1$–$C_{19}$-alkyl, $C_2$–$C_{19}$-alkenyl, phenyl, $C_1$–$C_4$-alkylene phenyl, acryl formyl or acetyl; $R_4$ and $R_5$=same or different, $C_1$–$C_{19}$-alkyl, $C_2$–$C_{19}$-alkenyl, phenyl, $C_1$–$C_4$-alkylene phenyl, acryl, $C_5$–$C_{12}$-cycloalkyl or $C_5$–$C_{12}$-cycloalkenyl; $R_4$ and $R_5$ may also form a $C_4$–$C_7$-ring which may optionally contain an oxygen atom in ether form and the radicals $R_1$ and $R_2$ may form a $C_5$–$C_{12}$-alkylene bridge or a $C_5$–$C_{12}$-alkenylene bridge, the radicals $R_1$ and $R_4$ may form a $C_2$–$C_9$-alkylene bridge and the radicals $R_1$ and $R_3$ may form a $C_3$–$C_{10}$-alkylene bridge; where $R_1$ and $R_2$ are attached, the ring formed may be bridged by a $C_1$–$C_4$-alkylene bridge and the ring systems formed may be substituted by the radical $R_6$ which represents hydrogen, $C_1$–$C_5$-alkyl or $C_2$–$C_5$-alkenyl, in quantities of from 0.05 to 3% by weight, based on 100 parts by weight of monomer, to the aqueous emulsion polymerization of chloroprene at the beginning of the reaction, during or after polymerization, but at the latest before the residual monomers are removed, high-viscosity polychloroprenes characterized by excellent processing behaviour and product properties are obtained.

8 Claims, No Drawings

PROCESS FOR THE PRODUCTION OF HIGH MOLECULAR WEIGHT POLYCHLOROPRENE AND ITS USE AS A STARTING MATERIAL FOR ADHESIVES

This invention relates to a process for the production of high molecular weight poly-2-chlorobutadiene (polychloroprene) characterised by good vulcanisate properties and to its use as a starting material for adhesives.

It is already known that 2-chlorobutadiene (chloroprene) is polymerised in alkaline aqueous emulsion in the presence of radical initiators. Chloroprene polymers are understood to be both hompolymers of chloroprene and also copolymers with up to 20% by weight of various comonomers, based on the polymer as a whole.

The comonomers normally used are, for example, 1-chlorobutadiene, 2,3-dichlorobutadiene, styrene, isoprene, acrylonitrile, acrylic esters and methacrylic acid. The molecular weight of the polymer formed is controlled by the addition of sulphur-containing organic chain transfer agents, such as mercaptans for example. The polymerisation temperatures may be in the range of from 5° to 80° C., but are generally in the range of from 8° to 50° C.

At these reaction temperatures, polymerisation is terminated at a monomer conversion of from 50 to 85%, normally from 60 to 70%. Although continued polymerisation of the residual monomers gives products of high molecular weight, the products obtained are more difficult to process and their properties no longer correspond to the high level of this versatile elastomer. It would be advantageous to be able to polymerise chloroprene monomer to form products of high viscosity without adversely affecting the favourable properties of the product.

It is possible by decreasing the amount of chain transfer agent, normally mercaptans such as n-dodecyl mercaptan (n-DDM), to increase the main chain length of the polychloroprene and hence to increase the viscosity of the polymer. However, this is only possible to a limited extent. If the regulator content prevailing during polymerisation is too low, unstorable solid rubbers characterised by poor vulcanisate properties are obtained after working-up.

Accordingly, attempts have been made (cf German Offenlegungsschrift No. 2,060,659) to improve the product properties of highly viscous chloroprene polymers by adding the chain transfer agent in portions during the polymerisation reaction. However, the number and size of the additions of regulator are dependent upon the polymerisation temperature, the degree of conversion and the required polymer viscosity. In addition, the additions of regulator have to be made at certain monomer conversions. This measure is impracticable where polymerisation is carried out continuously on account of the wide range of conversions obtained in the various reaction vessels.

It was therefore surprising to find that highly viscous polychloroprenes characterised by excellent processing behaviour and product properties can be obtained by adding compounds corresponding to general formula (I) below at the beginning of, during or after polymerisation, but at the latest before the residual monomers are removed. The properties stand out very clearly particularly when the compounds of general formula (I) are added at the beginning of the reaction.

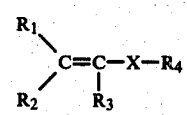

These compounds, of which the parent compound contains a heteroatom in the α-position to a carbon double bond, are added in a concentration of from 0.05 to 3% by weight, based on 100 parts of starting monomer.

The substituents represent the following radicals:
$X = O$, S or $NR_5$,
$R_1 =$ hydrogen, $C_1$–$C_{19}$-alkyl, $C_2$–$C_{19}$-alkenyl, phenyl, $C_1$–$C_4$-alkylene phenyl (aralkyl), $C_5$–$C_{12}$ cycloalkyl or $C_5$–$C_{12}$-cycloalkenyl,
$R_2 =$ hydrogen, $C_1$–$C_{19}$-alkyl, $C_2$–$C_{19}$-alkenyl, phenyl or $C_1$–$C_4$-alkenylene phenyl (aralkyl),
$R_3 =$ hydrogen, $C_1$–$C_{19}$-alkyl, $C_2$–$C_{19}$-alkenyl, phenyl, $C_1$–$C_4$-alkylene phenyl (aralkyl), acryl, formyl or acetyl,
$R_4$ and $R_5 =$ same or different, $C_1$–$C_{19}$-alkyl, $C_2$–$C_{19}$-alkenyl, phenyl, $C_1$–$C_4$-alkylene phenyl (aralkyl), acryl, $C_5$–$C_{12}$-cycloalkyl or $C_5$–$C_{12}$-cycloalkenyl.

The radicals $R_4$ and $R_5$ may also form a $C_4$–$C_7$-ring which may also contain oxygen in ether form.

The radicals $R_1$ and $R_2$ may also represent an alkylene group, in which case the compounds correspond to general formula (Ia) below. The ring formed may consist of 5 to 12 C-atoms.

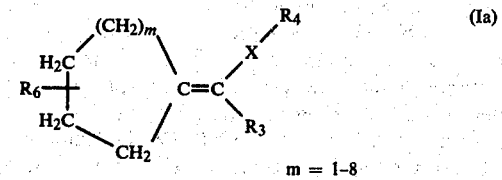

The hydrocarbon ring corresponding to general formula (Ia) may also contain a double bond, in which case the compounds correspond to general formula (Ib) below:

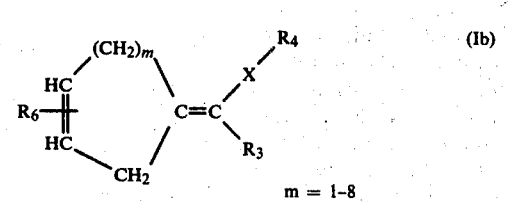

in which $R_6$ is hydrogen, a $C_1$–$C_5$-alkyl radical or a $C_2$–$C_5$-alkenyl radical.

In addition, these rings may be bridged by 1 to 4 $CH_2$-groups, in which case compounds corresponding to general formula Ic are formed.

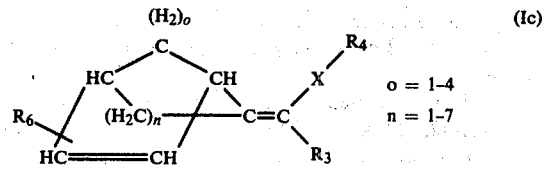

The radicals $R_1$ and $R_4$ in formula (I) may also be attached to one another through a $C_2$–$C_9$-alkylene bridge, forming a heterocycle corresponding to formula (Id) below:

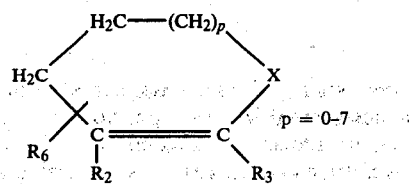

It is also possible for the radicals $R_1$ and $R_3$ to be attached to one another through an alkylene bridge containing from 3 to 10 carbon atoms, in which case the compounds formed correspond to general formula (Ic) below:

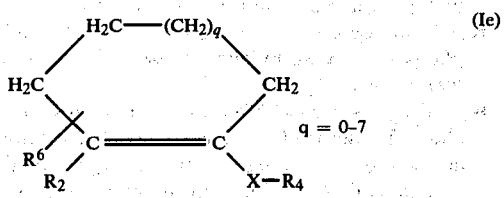

The sum total of carbon atoms in the compounds corresponding to the above general formulae should not exceed 50.

Where $X=NR_5$ in general formula (Ie), the radicals $R_4$ and $R_5$ may also form a $C_4$–$C_7$-ring which may also contain oxygen in ether form.

A number of compounds corresponding to general formulae (I) and (Ia) to (Ie) are mentioned by way of example in the following. They are produced by the methods described in the literature.

Compounds in which $X=NR_5$ (W. D. Emmons, A. S. Pagano, Organic Syntheses, Collective Volume 5, 191 (1973), R. B. Moffet, Organic Syntheses, Collective Volume 4, 605 (1963), John Wiley; Houben-Weyl, Vol VII (1954), page 453 and Vol. XI, 2 (1958), page 74, Thieme Verlag, Stuttgart).

N-isobutenyl piperidine
N-isobutenyl morpholine
N-isobutenyl diethylamine
N-isobutenyl dipropylamine
N-isobutenyl diisobutylamine
N-isobutenyl diisobutylamine
N-isobutenyl perhydroazepine
N-(cyclohexylidene methyl)-morpholine
N-(cyclohexylidene methyl)-dibutylamine
N-(cyclohexylidene methyl)-diethylamine
N-(cyclohexylidene ethyl)-piperidine
N-(3-cyclohexenylidene methyl)-piperidine
N-(bicyclo[2,2,1]-hepten-5-ylidene methyl-2)-piperidine
N-(3-cyclohexenylidene methyl)-morpholine
N-(bicyclo[2,2,1]-hepten-5-ylidene methyl-2)-perhydroazepine
N-(3-cyclohexenylidene methyl)-pyrrolidine
N-(bicyclo[2,3,1]-hepten-5-ylidene methyl-2)-dibutylamine
N-(3-cyclohexenylidene methyl)-perhydroazepine
N-(bicyclo[2,2,1]-hepten-5-ylidene methyl-2)-dipropylamine
N-(3-or 4- or 5-methyl-3-cyclohexenylidene methyl)-dibutylamine
N-ethyl-3-methyl-aza-2-cyclohexene
N-(3-methyl-3-cyclohexenylidene methyl)-dipropylamine
N-(3-cyclohexenylidene methyl)-chloroethylamine
N-methyl-2-methyl-aza-cyclohexene
N-(3-cyclohexenylidene methyl)-dimethylamine
N-(cyclohexenyl)-piperidine
N-(2-methyl cyclohexenyl)-piperidine
N-(2-methyl cyclohexenyl)-morpholine
N-(3-methyl cyclohexenyl)-piperidine These enamines are in a tautomeric equilibrium with the corresponding Schiffs bases, N-cyclohexenyl cyclohexylamine
N-(2-methyl cyclohexenyl)-cyclohexylamine
N-(3-methyl cyclohexenyl)-cyclohexylamine
N-(3,5,5-trimethyl cyclohexenyl)-cyclohexylamine
N-cyclohexenyl-2-ethyl hexylamine
N-cyclohexenyl dicylamine Compounds in which $X=O$ or $S$ (German Offenlegungsschrift No. 28 37 026):
(2-methyl-4-butene)n-decyl ether
(1,2-dimethyl butene) methyl ether
(1,2-dimethyl butene) ethyl ether
(1,2-dimethyl butene) propyl ether
(1,2-dimethyl butene) butyl ether
(1,2-dimethyl butene) pentyl ether
(1,2-dimethyl butene) stearyl ether
2-methylpropene benzyl ether
2-methylpropene (o,m,p)-methylbenzyl ether
2-methylpropene (o,m,p)-ethylbenzyl ether
2-methylpropene ethyl thioether
2-methylpropene dodecyl thioether
2-methylpropene tert.-dodecyl thioether
2-methylpropene phenyl thioether
2-methylpropene 4-tert.-butyl-phenyl thioether
2-methylpropene cyclohexyl ether
bis-(2-methylpropene) ethylene diether
bis-(2-methylpropene) butylene-1,4-diether
bis-(2-methylpropene) hexylene-1,6-diether
[cyclohexyl-ylidene methyl]cyclohexyl ether
[cyclohexyl-ylidene methyl]butyl ether
[cyclohexyl-ylidene methyl]benzyl thioether
[cyclohexyl-ylidene methyl]-dodecyl thioether
[3- or 4- or 5-methylcyclohexyl-ylidene methyl]butyl thioether
[3- or 4- or 5-methylcyclohexyl-ylidene methyl]benzyl ether
[cyclohexyl-ylidene methyl]propyl ether
[2-cyclohexyl-ylidene ethyl]2-ethyl-benzyl ether
cyclohexyl-ylidene-methyl octadecyl ether
[3- or 4- or 5-methylcyclohexen-3-ylidene methyl]butyl ether
[3- or 4- or 5- or 2-methyl-3-cyclohexenylidene methyl]-hexyl ether
[2- or 3- or 4- or 5-methyl-3-cyclohexenylidene methyl]octyl ether
[4-methyl-cyclohexen-3-ylidene methyl]butyl ether
[3-methylcyclohexen-ylidene methyl]benzyl ether
[cyclohexen-(3)-ylidene methyl]cyclohexyl ether
[cyclohexen-(3)-ylidene methyl]benzyl ether
[cyclohexen-(3)-ylidene methyl]propyl ether
[cyclohexen-(3)-ylidene methyl]butyl ether
[cyclohexen-(3)-ylidene methyl]pentyl thioether
[cyclohexen-(3)-ylidene methyl]decyl ether
[cyclohexen-(3)-ylidene methyl]pentadecyl ether
[cyclohexen-(3)-ylidene methyl]octadecyl ether
[2,5-endomethylene-cyclohexen-(3)-ylidene methyl]cyclohexyl ether

[2,5-endomethylene-cyclohexen-(3)-ylidene methyl]-hexyl ether
[2,5-endomethylene-cyclohexen-(3)-ylidene methyl]-benzyl ether
[2,5-endomethylene-cyclohexen-(3)-ylidene methyl]2-ethyl hexyl ether
[2,5-endomethylene-cyclohexen-(3)-ylidene methyl]3,4,5-trimethylhexyl thioether
[2,5-endomethylene-cyclohexene-(3)-ethylidene]cyclohexyl ether
(2-methyl cyclohexenyl)octyl ether
(2-methyl cyclohexenyl) benzyl ether
2-acetyl-oxa-2-cyclohexene
2-formyl-oxa-2-cyclohexene
2-acetyl-3-methyl-oxa-2-cyclohexene
cyclohexenyl n-butyl ether
2-methylcyclohexenyl n-butyl ether
2-methylcyclohexenyl n-propyl ether Compounds corresponding to general formula (Ie) have proved to be particularly effective. The effects stand out particularly clearly where compounds corresponding to general formulae (Ib) and (Ic) are added.

These compounds are added in quantities of from 0.05 to 3.0% by weight and preferably in quantities of from 0.1 to 1.5% by weight, preferably before the beginning of the reaction or up to a monomer conversion of 40%. The polymer thus obtained, which has a Mooney viscosity in the range of from 80 to 200 MU and preferably in the range of from 130 to 170 MU, is distinguished by its high stability to thermal stressing. Considerable thermal stressing occurs, for example, when the coagulated latex is dried on the dryer by IR-radiation and/or hot air. The improved processing behaviour is particularly reflected in much quicker rough sheet formation. The vulcanised polymers are distinguished by a higher strength level.

The favourable effect upon the properties of the polymer is particularly noticeable in polychloroprenes of the type used in the manufacture of adhesives. It is precisely high viscosity adhesives, whose lack of stability in storage seriously affects their processibility, that show excellent storage behaviour and considerably improved pot lives through the addition of compounds corresponding to general formula (I).

The polymerisation reaction is carried out in aqueous-alkaline emulsion in the presence of radical initiators. Suitable emulsifier systems are alkali metal salts of water-soluble saturated or unsaturated monocarboxylic acids, for example disproportionated resinic acids, optionally in admixture with fatty acids, such as oleic acid or coconut oil fatty acid. The emulsifiers are added in quantities of from 2 to 10 parts by weight and preferably in quantities of from 3 to 5 parts by weight, based on 100 parts of monomer.

Condensation products of naphthalene sulphonic acid and formaldehyde are also used as additional emulsifiers. In their case, it has been found to be favourable to add from 0.4 to 1.5 parts of these surface-active compounds of the sulphate or sulphonate type per 100 parts by weight of monomer.

Chain transfer agents, such as alkyl mercaptans or dialkyl xanthogen disulphides, are added to regulate molecular weight. The quantity in which the mercaptan, for example dodecyl mercaptan, is used influences the molecular weight of the polymer formed. The average molecular weight of the polymer decreases with increasing quantity of mercaptan, as reflected in the falling Mooney viscosity of the products.

The reaction product has a Mooney range favourable for further processing when the mercaptan is added in quantities of from 0.1 to 0.3 parts by weight per 100 parts of monomer.

The quantities of chain transfer agents required to obtain the desired polymer viscosity may readily be determined by the expert.

Where the emulsifier system described above is used, the emulsion has to have a pH-value above 10 and preferably in the range of from 12 to 13.5.

Polymerisation is initiated by the addition of known polymerisation initiators. Suitable initiators are radical-forming compounds such as, for example, alkali metal persulphates, hydrogen peroxide and organic peroxides, such as cumene hydroperoxide or benzoyl peroxide. Polymerisation may also be initiated by the addition of reducing agents, such as formamidine sulphinic acid. The temperature prevailing during the polymerisation reaction may vary between 0° and 60° C., the temperature range of from 5° to 45° C. having proved to be favourable. Inhibitors, such as phenothiazine, terminate polymerisation at a monomer conversion of from 50 to 96%, polymerisation advantageously being terminated at a monomer conversion of from 70 to 90%.

The residual, unreacted monomer may be removed by steam distillation. The pH-value of the alkaline latex is reduced to pH 5-7 by the addition of dilute acetic acid and the polymer is isolated from this emulsion, for example by low-temperature coagulation, and dried, as described for example in Chem. Engng. Progr. 43, 391 (1974) and in German Pat. No. 1,051,506. However, working up may also be carried out by other conventional methods of the type described, for example, in German Pat. No. 1,111,804.

For the production of adhesives, the polychloroprene is dissolved in organic solvents, such as benzene, toluene, methylene chloride or trichloroethylene, or in mixtures of these solvents with other solvents which are unable to dissolve polychloroprene on their own, such as petrol, cyclohexane or methyl acetate.

The viscosity of the solution depends upon the application envisaged and is preferably in the range of from 10 to 100 poises, as measured at 20° C. using a Brookfield LVT viscometer.

Other methods for producing polychloroprene adhesives are described in German Auslegeschrift No. 1,200,988.

The invention is illustrated by the following Examples:

EXAMPLE 1

(Comparison Example)

3.5 kg of the sodium salt of a disproportionated resinic acid, 0.5 kg of the sodium salt of a naphthalene sulphonic acid/formaldehyde condensation product and 0.6 kg of sodium hydroxide are dissolved in 120 kg of water. 90 kg of chloroprene and 0.126 kg of n-dodecyl mercaptan are emulsified in this solution. The emulsion is purged with nitrogen, heated to +45° C. and polymerisation is carried out by the continuous addition of 3% aqueous formamidine sulphinic acid.

The polymerisation temperature is kept at +45° C. The reaction is terminated at a monomer conversion of 66% by the addition of 90 g of phenothiazine. The residual monomer is removed from the polymer by steam distillation and the polymer latex is concentrated by freezing and isolated on a cooling cylinder after its pH-value has been lowered to 7.0. The polymer has a Mooney value ML-4' of 105 MU. The polymerisation process described in Example 1 is outside the scope of the invention.

EXAMPLES 2 TO 6

The procedure is the same as in Example 1, except that different quantities of n-dodecyl mercaptan (n-DDM) are added. In Examples 2, 4 and 6, compound A is additionally added at the beginning of the reaction.

The concentration in which this compound is used and the Mooney viscosities of the polymer samples are shown in Table 1.

The polymers of Examples 1 to 6 are subsequently mixed with the following components in the usual way on mixing rolls:

| Formulation | |
|---|---|
| Polychloroprene | 100 parts by weight |
| Inactive carbon black | 48 parts by weight |
| Plasticiser | 25 parts by weight |
| Stearic acid | 0.5 part by weight |
| Phenyl-β-naphthylamine | 2.0 parts by weight |
| Magnesium oxide | 4.0 parts by weight |
| Zinc oxide | 5.0 parts by weight |
| Ethylene thiourea | 0.75 part by weight |
| Tetramethyl thiuram disulphide | 0.9 part by weight |

Vulcanistaion is carried out for 30 minutes at 150° C. The property spectrum of the vulcanisates thus obtained is shown in Table 1. As can be seen, the strengths of the vulcansates increase considerably precisely when compounds corresponding to general formula (I) are present during polymerisation, as explained by way of example with reference to compound A.

TABLE 1

| Example No. | 1[1] | 2 | 3[1] | 4 | 5[1] | 6 |
|---|---|---|---|---|---|---|
| Quantity of regulator (parts) | 0.14 | 0.14 | 0.11 | 0.11 | 0.11 | 0.11 |
| Addition of compound A | — | 0.8 | — | 0.5 | — | 0.5 |
| Monomer conversion (%) | 66 | 70 | 69 | 69 | 88 | 90 |
| Mooney Viscosity (100° C.) MU | 105 | 108 | 148 | 142 | 152 | 150 |
| Tensile strength (kp/m$^2$) | 125 | 130 | 110 | 128 | 105 | 121 |
| Breaking elongation (%) | 475 | 520 | 460 | 540 | 390 | 510 |
| Modulus, 300% elongation (kp/m$^2$) | 70 | 74 | 70 | 74 | 69 | 74 |
| Shore-A-hardness at RT | 50 | 51 | 51 | 51 | 50 | 51 |
| Elasticity (%) | 49 | 51 | 50 | 51 | 49 | 50 |

Compound A: N—(3-cyclohexenylidene-methyl)-dibutylamine
[1] = Comparison Examples Table 1 shows that all the vulcanisates of the polymers produced in accordance with the invention (Nos. 2, 4 and 6 in Table 1) show distinctly higher tensile strength and higher elongations than vulcanisates of corresponding polymers produced by the conventional method, even with high monomer conversions.

EXAMPLE 7

(Comparison Example)

For producing polychloroprene adhesive, a mixture of the following composition was polymerised under nitrogen:

| | |
|---|---|
| Chloroprene | 100.0 parts by weight |
| n-dodecyl mercaptan | 0.1 part by weight |
| Deionised water | 140.0 parts by weight |
| Sodium salt of a disproportionated | 6.0 parts by weight |

| -continued | |
|---|---|
| abietic acid | |
| Sodium salt of a naphthalene sulphonic acid/formaldehyde condensation product | 0.7 part by weight |
| Sodium hydroxide (100%) | 0.6 part by weight |
| Potassium peroxydisulphate | 0.1 part by weight |

Polymerisation is carried out at +10° C. with continuous introduction of 2% aqueous formamidine sulphinic acid. The reaction is terminated at a monomer conversion of 71% by the addition of 0.1 part of phenothiazine. Working up is carried out in the same way as described in Example 1. The polymer has a Mooney value ML-4' of 128 MU.

EXAMPLE 8

The procedure is the same as in Example 7, except that 0.5 part by weight of compound A is added to the polymer latex laden with residual monomer before expansion and working up in the dryer. Polymerisation is terminated at a monomer conversion of 69%. The polymer worked up has a Mooney viscosity ML-4' of 126 MU.

EXAMPLE 9

The procedure is the same as in Example 7, except that 0.5 part of compound A is added during polymerisation at a monomer conversion of 40%. The polymerisation reaction is terminated at a monomer conversion of 70%. The polymer has a Mooney viscosity ML-4' of 128 MU.

EXAMPLE 10

The procedure is the same as in Example 7, except that 0.5 part of compound A is added to the mixture before the beginning of polymerisation. Polymerisation is terminated at a monomer conversion of 70%. The polymer has a Mooney viscosity ML-4' of 124 MU.

EXAMPLE 11

(Comparison Example)

The procedure is the same as in Example 7, except that the quantity of molecular weight regulator (n-dodecyl mercaptan) is reduced from 0.1 to 0.08 part by weight. Polymerisation is terminated at a monomer conversion of 68%. The polymer has a Mooney viscosity ML-4' of $\geq 200$ MU.

EXAMPLE 12

The procedure is the same as in Example 11, except that 0.2 part by weight of compound A is added at a monomer conversion of 45%. Polymerisation is terminated at a monomer conversion of 66%. The polymer has a Mooney viscosity ML-4' of 159 MU.

EXAMPLE 13

(Comparison Example)

In order to determine solution viscosity, 170 g of the polychloroprene produced in accordance with Examples 7 to 12 are dissolved in 830 g of a solvent mixture of ethyl acetate, petrol 65/95, toluene (ratio by weight 2:2:1) while stirring with a laboratory stirrer (600 r.p.m.). The adhesives thus obtained were diluted to a viscosity of 3 Pas, as measured at 20° C. with a Brookfield LVT viscometer (No. 4 spindle, 30 r.p.m.), by the addition of further quantities of the same solvent mixture and are then stored in sealed drums at 20° C./65% relative air humidity. After storage for 6 months, their viscosity was remeasured.

| Polychloroprene according to Example No. | Solution viscosity (Pas)+ | |
|---|---|---|
| | Fresh | After storage for 6 months |
| 7[1] | 3.0 | 9.0 |
| 8 | 3.0 | 4.4 |
| 9 | 3.0 | 3.4 |
| 10 | 3.0 | 3.0 |
| 11[1] | 3.0 | 14.0 |
| 12 | 3.0 | 6.0 |

+ as measured at 20° C. using a Brookfield LVT viscometer (no. 4 spindle, 30 r.p.m.)
[1] Comparison Examples

EXAMPLE 14

(Pot life)

25 g of polychloroprene produced in accordance with Examples 7 to 12 are dissolved in 125 g of a solvent mixture of ethyl acetate, petrol, 65/95, toluene (ratio by weight 2:2:1) while stirring with a laboratory stirrer (600 r.p.m.). The adhesives thus obtained were diluted to a viscosity of 1.5 Pas, as measured at 20° C. with a Brookfield LVT viscometer (No. 4 spindle, 30 r.p.m.), by the addition of further quantities of the same solvent mixture. 7.5 g of Desmodur RF (a 20% solution of thiophosphoric acid-tris-(p-isocyanatophenyl ester) in methylene chloride) were thoroughly mixed with this solution and the viscosity of the adhesive mixture thus obtained was measured over a period of 30 seconds using a Brookfield LVT viscometer (No. 4 spindle, 60 r.p.m.). The container was then stored at 20° C./65% relative air humidity and the increase in the viscosity of the mixture was determined by hourly measurement using a Brookfield LVT viscometer until the initial viscosity had been increased by 50%.

| Polychloroprene according to Example No. | Solution viscosity (Pas)* Fresh | >50% increase in viscosity after (h) |
|---|---|---|
| 7** | 1.2 | 20 |
| 8 | 1.2 | 36 |
| 9 | 1.2 | 45 |
| 10 | 1.2 | 48 |
| 11** | 1.2 | 16 |
| 12 | 1.2 | 35 |

*as measured at 20° C. using a Brookfield LVT viscometer (no. 4 spindle, 30 r.p.m.)
**Comparison Examples

EXAMPLE 15

(rough sheet formation on Berstorf rolls)

Rough sheet formation was tested on Berstorf rolls (rolls 1.50 m long) for a production ratio of 1:1:10.

25 kg of the polychloroprene produced in accordance with Examples 7 to 12 were initially passed twice through cooled rolls adjusted to a gap width of 1 mm. The time which it takes for a continuous sheet to be formed on the rotating rolls was then measured at a gap width of 2 mm.

| Polychloroprene according to Example No. | Rough sheet formation time (mins.) |
|---|---|
| 7[1] | 8 |
| 8 | 3 |
| 9 | 3 |
| 10 | 3 |
| 11[1] | 9 |
| 12 | 4 |

[1] Comparison Examples

The Examples clearly show that the polymers produced in accordance with the invention (Examples 8 to 10, 12) show excellent storage behaviour in solution (Examples 13, 14) by comparison with polymers produced in the usual way (Examples 7, 11). Another surprising aspect was the short rough sheet formation time of the polymers which had been polymerised in the presence of compound A (Table 1), Example 15. This ether is an Example of the claimed compounds corresponding to the general formula (I).

EXAMPLES 16 TO 20

(Solution Viscosity)

The procedure is as in Example 10, except that compound A is replaced by compounds B-F which are examples of compounds corresponding to the general formulae (Ia)–(Ie). They have the following structure:
B = N-(cyclohexylidene-methyl)-dibutyl amine
C = N-cyclohexenyl-(2-ethyl hexyl)-amine
D = N-(3-cyclohexenylidene-methyl)-methyl phenyl amine
E = N-(bicyclo[2,2,1]-hepten-5-ylidene-2-methyl)-piperidine
F = N-ethyl-3-methyl-aza-2-cyclohexene The considerably improved product properties may be demonstrated, for example, by determining the solution viscosity. The adhesive mixtures of Examples 16 to 20 are prepared in accordance with Example 13. The following solution viscosities are obtained:

| Polychloroprene according to Example No. | Compound | Solution viscosity (Pas) | |
|---|---|---|---|
| | | Fresh | After storage for 6 months |
| 16 | B | 3.0 | 3.5 |
| 17 | C | 3.0 | 3.8 |
| 18 | D | 3.0 | 3.0 |
| 19 | E | 3.0 | 3.1 |
| 20 | F | 3.0 | 3.4 |

As can be seen, polymers which have been produced in the presence of compounds B to F also show distinctly improved storage behaviour by comparison with the polymer produced by the standard polymerisation process (Example 7 in Example 13).

EXAMPLES 21 TO 25

The procedure is as described in Example 1, except that different quantities of n-dodecyl mercaptan (n-DDM) are added. In Examples 21, 23 and 25, compound G is additionally introduced at the beginning of the reaction.

The concentrations in which this compound is used and the Mooney viscosities of the polymer samples are shown in Table 2.

The polymers of Examples 21 to 25 are subsequently mixed with the following components in the usual way on mixing rolls:

| Formulation | |
|---|---|
| Polychloroprene | 100 parts by weight |
| Inactive carbon black | 48 parts by weight |
| Plasticiser | 25 parts by weight |
| Stearic acid | 0.5 part by weight |
| Phenyl-$\beta$-naphthylamine | 2.0 parts by weight |
| Magnesium oxide | 4.0 parts by weight |
| Zinc oxide | 5.0 parts by weight |
| Ethylene thiourea | 0.75 part by weight |
| Tetramethyl thiuram disulphide | 0.9 part by weight |

Vulcanisation is carried out for 30 minutes at 150° C. The property spectrum of the vulcanisates thus obtained is shown in Table 2. As can be seen, the strengths of the vulcanisates increase considerably precisely when compounds corresponding to general formula (I) are present during polymerisation as explained by way of example with reference to compound G.

TABLE 2

| Example No. | 1[1] | 21 | 22[1] | 23 | 24[1] | 25 |
|---|---|---|---|---|---|---|
| Quantity of regulator (parts) | 0.14 | 0.14 | 0.11 | 0.11 | 0.11 | 0.11 |
| Addition of compound G | — | 0.6 | — | 0.4 | — | 0.4 |
| Monomer conversion (%) | 68 | 69 | 67 | 69 | 88 | 89 |
| Mooney viscosity (100° C.) MU | 110 | 108 | 142 | 138 | 152 | 146 |
| Tensile strength (MPa) | 12.1 | 13.4 | 11.2 | 12.8 | 10.8 | 12.8 |
| Breaking elongation (%) | 480 | 520 | 460 | 510 | 430 | 500 |
| Modulus, 300% elongation (MPa) | 5.0 | 5.1 | 5.1 | 5.1 | 5.0 | 5.1 |
| Elasticity (%) | 49 | 51 | 50 | 51 | 49 | 50 |

[1] = Comparison Example
Compound G = [cyclohexen-(3)-ylidene-methyl]benzyl ether Table 2 shows that all the vulcanisates of the polymers produced in accordance with the invention (Nos. 21, 23 and 25 in Table 2) show distinctly higher tensile strengths and higher elongations that vulcanisates of corresponding polymers produced by the conventional method, even with a high monomer conversion.

EXAMPLE 26

The procedure is the same as in Example 1, except that 0.4 part by weight of compound G is added to the polymer latex freed from the residual monomer before coagulation and working up on a dryer. Polymerisation is terminated at a monomer conversion of 66%. The polymer worked up has a Mooney viscosity ML-4' of 108 MU.

EXAMPLE 27

The procedure is the same as in Example 1, except that 0.4 part of compound G are added during polymerisation at a monomer conversion of 40%. Polymerisation is terminated at a monomer conversion of 70%. The polymer has a Mooney viscosity ML-4' of 112 MU.

EXAMPLE 28

The procedure is as in Example 1, except that 0.4 part of compound G are added to the mixture before the beginning of polymerisation. Polymerisation is terminated at a monomer conversion of 71%. The polymer has a Mooney viscosity ML-4' of 108 MU.

EXAMPLE 29

(Comparison Example)

The procedure is as in Example 1, except that the quantity in which the molecular weight regulator (n-dodecyl mercaptan) is used is reduced from 0.14 to 0.08 part by weight. The polymerisation reaction is terminated at a monomer conversion of 67%. The polymer has a Mooney viscosity ML-4' of >200 MU.

EXAMPLE 30

The procedure is as in Example 29, except that 0.2 part by weight of compound G is added at the beginning of the reaction. Polymerisation is terminated at a monomer conversion of 70%. The polymer has a Mooney viscosity ML-4' of 160 MU.

The rubbers are vulcanised in the same way as described in Examples 21 to 25. The effect of the claimed compounds on the product properties is reflected, for example, in the strengths of the vulcanisates (cf. Table 3). As can be seen, the effect is particularly noticeable when the claimed compounds are added before or during polymerisation.

TABLE 3

| Example No. | 26 | 27 | 28 | 29[1] | 30 |
|---|---|---|---|---|---|
| Compound G quantity (parts) | 0.4 | 0.4 | 0.4 | 0 | 0.2 |
| addition | after polymerisation | at a conversion of 40% | at the beginning of polymerisation | — | at the beginning of polymerisation |
| (%) | 66 | 70 | 71 | 67 | 70 |
| Mooney Viscosity (100° C.) MU | 108 | 112 | 108 | 200 | 160 |
| Tensile strength (MPa) | 12.8 | 13.1 | 13.3 | 8.4 | 12.8 |

[1] = Comparison Example

EXAMPLE 31

(Rough sheet formation on Berstorf rolls)

Rough sheet formation was tested on Berstorf rolls (rolls 1.50 m long) at a production ratio of 1:1.10.

25 kg of the polychloroprene produced in accordance with Examples 1, 21, 24, 25, 29 and 30 were first passed twice through cooled cylinders adjusted to a gap width of 1 mm. The time which it takes for a continuous sheet to form on the rotating rolls was then determined at a gap width of 2 mm.

| Polychloroprene according to Example No. | Rough sheet formation time (mins) |
|---|---|
| 1[1] | 5 |
| 21 | 2 |
| 24[1] | 7 |
| 25 | 2 |
| 29[1] | 12 |
| 30 | 5 |

[1] = Comparison Example

The Examples clearly show that the polymers produced in accordance with the invention (Examples 21, 25, 30) have short rough sheet formation times by comparison with polymers produced by the conventional method (Examples 1, 24 and 29).

EXAMPLES 32 TO 36

The procedure is as in Example 1, except that, in Examples 32 to 35, compounds H to K are additionally introduced at the beginning of the reaction in concentrations of 0.5% by weight. The Mooney viscosities of the polymers are shown in Table 4.

TABLE 4

| Example No. | 32 | 33 | 34 | 35 | 36[1] |
|---|---|---|---|---|---|
| Quantity of regulator (parts) | 0.1 | 0.1 | 0.1 | 0.1 | 0.1 |
| Addition of compound | H | I | J | K | — |
| Monomer conversion (%) | 80 | 81 | 80 | 82 | 82 |
| Mooney viscosity 100° C. (MU) | 145 | 148 | 144 | 152 | 158 |

[1] = Comparison Example
H = cyclohexenyl octyl ether
I = (cyclohexen-3-ylidene-methyl)pentyl ether
J = (2,5-endomethylene-cyclohexen-3-ylidene-methyl) cyclohexyl ether
K = 2-acetyl-oxa-2-cyclohexene

EXAMPLE 37

(Processing on rolls)

A carbon black mixture is prepared in accordance with ISO 2575 from the polymers of Examples 32 to 36 and measured to determine its Defo hardness and mixture viscosity. The results are shown in Table 5.

TABLE 5

| Example No. | 32 | 33 | 34 | 35 | 36[1] |
|---|---|---|---|---|---|
| Defo hardness (80° C.) (N) | 21.0 | 19.5 | 19.5 | 21.0 | 25.5 |
| Mooney viscosity (MU) | 132 | 122 | 120 | 135 | 142 |
| Defo-Mooney relation | 16 | 16 | 16.3 | 15.6 | 18 |

[1] = Comparison Example

As Examples 32 to 35 show, the polymers produced in accordance with the invention have lower Defo hardnesses and Defo-Mooney relations after processing, which means that they show much more favourable processing behaviour on rolls.

EXAMPLE 38

The procedure is as in Example 7, except that 0.4 part by weight of compound G is added to the polymer latex freed from residual monomer before coagulation and working up on the dryer. Polymerisation is terminated at a monomer conversion of 69%. The polymer worked up has a Mooney viscosity ML-4' of 124 MU.

EXAMPLE 39

The procedure is as in Example 7, except that 0.4 part of compound G is added during polymerisation at a monomer conversion of 40%. Polymerisation is terminated at a monomer conversion of 70%. The polymer has a Mooney viscosity ML-4' of 125 MU.

EXAMPLE 40

The procedure is as in Example 7, except that 0.4 part of compound G is added to the mixture before the beginning of polymerisation. Polymerisation is terminated at a monomer conversion of 71%. The polymer has a Mooney viscosity ML-4' of 122 MU.

EXAMPLE 41

(Comparison Example)

The procedure is as in Example 7, except that the quantity in which the molecular weight regulator (n-dodecyl mercaptan) is used is reduced from 0.1 to 0.08 part by weight. Polymerisation is terminated at a monomer conversion of 67%. The polymer has a Mooney viscosity ML-4' of 200 MU.

EXAMPLE 42

The procedure is as in Examle 41, except that 0.2 part by weight of compound G is added at a monomer conversion of 42%. Polymerisation is terminated at a monomer conversion of 68%. The polymer has a Mooney viscosity ML-4' of 164 MU.

EXAMPLE 43

(Solution Viscosity)

To determine solution viscosity, 170 g of the polychloroprene produced in accordance with Examples 7 and 38 to 42 are dissolved in 830 g of a solvent mixture of ethylene acetate, petrol 65/95 toluene (ratio by weight 2:2:1) while stirring with a laboratory stirrer (600 r.p.m.).

The adhesives thus obtained were diluted to a viscosity of 3 Pas, as measured at 20° C. using a Brookfield LVT viscometer (No. 4 spindle, 30 r.p.m.), by the addition of further quantities of the same solvent mixture and were then stored in sealed cans at 20° C./65% relative air humidity. After storage for 6 months, their viscosity was remeasured.

| Polychloroprene according to Example No. | Solution viscosity (Pas)(*) | |
|---|---|---|
| | Fresh | After storage for 6 months |
| 7(**) | 3.0 | 8.5 |
| 38 | 3.0 | 4.1 |
| 39 | 3.0 | 3.5 |
| 40 | 3.0 | 3.0 |
| 41(**) | 3.0 | 12.0 |
| 42 | 3.0 | 5.0 |

(*)as measured at 20° C. using a Brookfield LVT viscometer (No. 4 spindle, 30 r.p.m.)
(**)Comparison Example

EXAMPLE 44

(Pot Life)

25 g of the polychloroprene produced in accordance with Examples 7 and 38 to 42 are dissolved in 125 g of a solvent mixture of ethyl acetate, petrol 65/95, toluene (ratio by weight 2:2:1) while stirring with a laboratory stirrer (600 r.p.m.). The adhesives thus obtained were diluted to a viscosity of 1.5 Pas, as measured at 20° C. using a Brookfield LVT viscometer (No. 4 spindle, 30 r.p.m.), by the addition of further quantities of the same solvent mixture.

7.5 g of Desmodur RF[1] were thoroughly mixed with this solution and the viscosity of the resulting adhesive mixture was determined over a period of 30 seconds using a Brookfield LVT viscometer (No. 4 spindle, 600 r.p.m.).

[1] A 20% solution of thiophosphoric acid-tris-(p-isocyanato-phenyl ester) in methylene chloride.

The container was then stored at 20° C./65% relative air humidity and the increase in viscosity of the mixture was determined by hourly measurement using the Brookfield LVT viscometer until the initial viscosity had increased by 50%.

| Polychloroprene according to Example No. | Solution viscosity (Pas)(*) Fresh | >50% increase in viscosity after (h) |
|---|---|---|
| 7[(1)] | 1.2 | 24 |
| 38 | 1.2 | 40 |
| 39 | 1.2 | 45 |
| 40 | 1.2 | 48 |
| 41[(1)] | 1.2 | 20 |
| 42 | 1.2 | 35 |

(*)as measured at 20° C. using a Brookfield LVT viscometer (No. 4 spindle, 30 r.p.m.)
[(1)]Comparison Examples

EXAMPLES 44 TO 48

(Solution Viscosity)

The procedure is as described in Example 40, except that compound G is replaced by compounds L to P which are examples of compounds corresponding to the general formulae (Ia) to (Ie). They have the following structures:
L = S-(cyclohexen-(3)-ylidene-methyl)-thioglycolic acid ethyl ester
M = (cyclohexen-(3)-ylidene-methyl)-4-isobutyl phenyl thioether
N = (2,5-endomethylene-cyclohexen-3-ylidene-methyl)2-ethylhexyl ether
O = 2-methyl-5-acetyl-oxa-2-cyclohexene
P = cyclohexenyl benzyl ether The considerably improved product properties may be demonstrated, for example, by measuring solution viscosity. The adhesive mixtures of Examples 44 to 48 were produced in accordance with Example 43. The following solution viscosities were measured:

| Polychloroprene according to Example No. | Compound | Solution viscosity (Pas) Fresh | After storage for 6 months |
|---|---|---|---|
| 44 | L | 3.0 | 3.5 |
| 45 | M | 3.0 | 3.0 |
| 46 | N | 3.0 | 3.0 |
| 47 | O | 3.0 | 3.2 |
| 48 | P | 3.0 | 3.4 |

As can be seen, polymers which have been produced in the presence of compounds L to P also show distinctly improved storage behaviour in relation to a polymer which has been produced by the conventional polymerisation process (Example 7).

We claim:
1. A process for the production of high molecular weight polychloroprene having a viscosity in the range of from 80 to 200 MU by polymerizing chloroprene with from 0 to 20% by weight of a comonomer copolymerizable therewith in aqueous emulsion in the presence of a regulator at a temperature of from 0° to 60° C. up to a monomer conversion of from 50 to 96%, characterized in that a compound of the formula

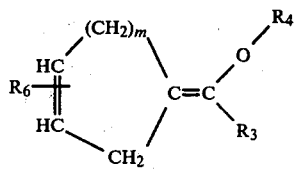

or a compound of the formula

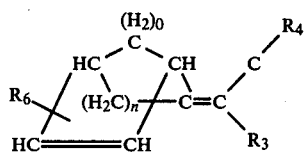

is added in a quantity of from 0.05 to 3% by weight, based on 100 parts by weight of monomer, at the beginning of the reaction, during or after polymerization but at the latest before residual monomers are removed, m being a number of from 1 to 8; n being a number of from 1 to 7; o being a number of from 1 to 4; $R_3$ being hydrogen, $C_1$–$C_{19}$-alkyl, $C_2$–$C_{19}$-alkenyl, phenyl, $C_1$–$C_4$-alkylene phenyl, acryl, formyl or acetyl; $R_4$ being $C_1$–$C_{19}$-alkyl, $C_2$–$C_{19}$-alkenyl, phenyl, $C_1$–$C_4$-alkylene phenyl, acryl, $C_5$–$C_{12}$-cycloalkyl or $C_5$–$C_{12}$-cycloalkenyl and $R_6$ being hydrogen, $C_1$–$C_5$-alkyl or $C_2$–$C_5$-alkenyl.

2. A process as claimed in claim 1, characterized in that polymerization is carried out at a temperature of from 5° to 45° C.

3. A process as claimed in claim 1, characterized in that polymerization is continued to a monomer conversion of from 70 to 90%.

4. A process as claimed in claim 1, characterized in that polymers having a Mooney viscosity in the range of from 130 to 170 ME are obtained.

5. A process as claimed in claim 1, characterized in that the compounds corresponding to said formulae are added before the beginning of polymerization.

6. A process as claimed in claim 1, characterized in that the compounds of said formulae are added during polymerization at a monomer conversion of up to 40%.

7. A process as claimed in claim 1, characterized in that the compounds of said formulae are added after polymerization before the residual monomers are removed.

8. An adhesive comprising a polychloroprene produced by the process of claim 1 dissolved in an organic solvent.

* * * * *

UNITED STATES PATENT AND TRADEMARK OFFICE
CERTIFICATE OF CORRECTION

PATENT NO. : 4,405,742

DATED : September 20, 1983

INVENTOR(S) : Rudiger Musch et al.

It is certified that error appears in the above-identified patent and that said Letters Patent is hereby corrected as shown below:

Column 16, change the second formula to read:

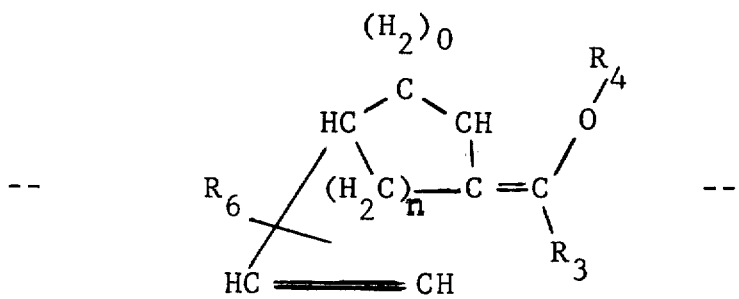

Signed and Sealed this

Twenty-fifth Day of September 1984

[SEAL]

Attest:

GERALD J. MOSSINGHOFF

Attesting Officer  Commissioner of Patents and Trademarks